United States Patent [19]

Hough

[11] 3,951,719

[45] Apr. 20, 1976

[54] VEHICLE TIRE CONSTRUCTION AND METHOD OF MAKING SAME

[76] Inventor: Dean R. Hough, 3901 Nantasket St., Pittsburgh, Pa. 15207

[22] Filed: Aug. 9, 1973

[21] Appl. No.: 386,869

Related U.S. Application Data

[63] Continuation-in-part of Ser. No. 218,757, Jan. 18, 1973, Pat. No. 3,752,206.

[52] U.S. Cl. .............................. 156/96; 152/330 R; 156/394
[51] Int. Cl.² ............................................. B29H 5/04
[58] Field of Search ............ 152/330 R, 361 R, 153; 156/128 R, 96, 394 R, 394 FM

[56] References Cited
UNITED STATES PATENTS

| | | | |
|---|---|---|---|
| 2,007,825 | 7/1935 | Day | 152/153 X |
| 3,024,827 | 3/1962 | Hough | 152/330 |
| 3,779,832 | 12/1973 | Reppel | 156/394 R |

*Primary Examiner*—Allen N. Knowles
*Assistant Examiner*—Hadd Lane
*Attorney, Agent, or Firm*—William J. Ruano

[57] ABSTRACT

A vehicle tire construction and method for retreaded (or new) tires involving the use of a single patch or more patches of cord of large mesh extending laterally of the tire casing between the buffed surface and tread rubber. The patch has stretchable or elastic cords, an intermediate portion thereof being connected to the cord ply layer of the casing and the ends projecting about half way or more of the sidewalls, and possibly as far as the beads, to vent air pockets which tend to accumulate. The patch makes use of the venting capabilities of the ply layers and, to some extent, the porous nature of the buffed surface.

The patch may also be interposed between the outer surface of a pre-cured retread and the surrounding plastic envelope which protects the tread from steam pressure during the curing period of the cushion gum rubber interposed between the pre-cured tread rubber and the buffed surface of the tire to be retreaded. The patch will vent air pockets otherwise formed in the grooves of the tire tread and enable the plastic envelope to penetrate and conform to the grooves forming the tread and thus permit uniform application of steam pressure to all sections of the tread.

7 Claims, 7 Drawing Figures

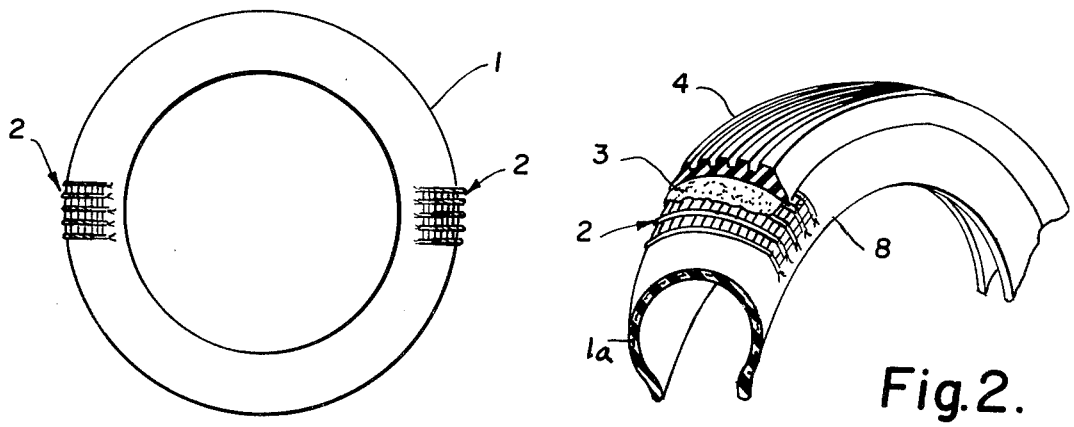
Fig.1.
Fig.2.
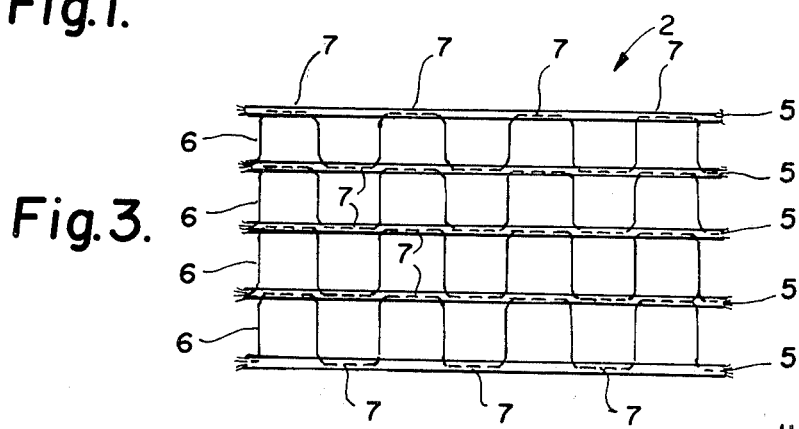
Fig.3.
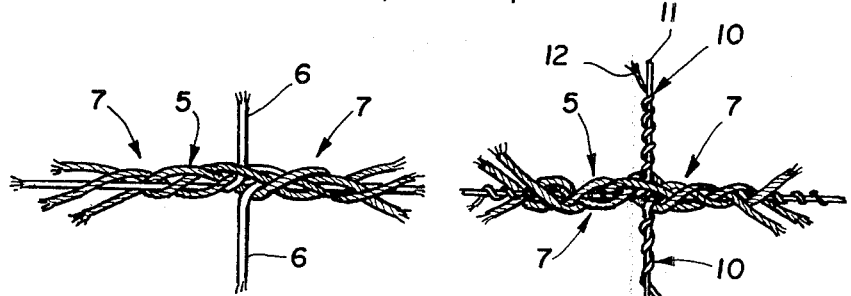
Fig. 4.
Fig.5.

VEHICLE TIRE CONSTRUCTION AND METHOD OF MAKING SAME

This is a continuation-in-part of my application Ser. No. 218,757, filed Jan. 18, 1973, now U.S. Pat. No. 3,752,206 of Aug. 14, 1973.

This invention relates to a vehicle tire construction and method of making the same and is an improvement over my U.S. Pat. Nos. 3,024,827, dated Mar. 13, 1962 and 3,562,295, dated Feb. 16, 1971.

An outstanding disadvantage of the venting cord net construction and arrangement shown in the aforesaid patents is that the cord net covers the casing, that is, it extends along the entire perimeter. This creates problems by requiring different widths of the cord net for different size tires such as passenger and truck tires, involving the necessity of an expensive inventory of cord nets of various widths.

A further disadvantage is that such cord net constructions extend only a short distance beyond the tire tread, therefore, during the curing process, particularly when using molds having long skirt matrices that fully cover three fourths of the side walls while the tire is being cured, air pockets will be trapped in the side walls or under the tread since the escape path is sealed by the molds. This fault is aggravatated by the present trend in this country to convert molding equipment to bead-to-bead retreading involving applying new rubber not only to the tread surface but to the sidewall area.

A still further disadvantage of the net cord arrangement described in my aforesaid patents is that considerable difficulty is involved in wrapping the net cord layer around the entire circumference of the carcass so as to cover it, particularly in anchoring the cut-ends of the cord net emerging from the sidewalls after being cut to the proper length to match the circumference of the tire. Staples have been used in the past for this purpose but these have the disadvantage of puncturing the sidewalls of the tire which often results in a fault which could develop into a blowout.

Added to this disadvantage, covering of the casing by the cord layers adds considerably to the cost to retreaders who work on a very low profit margin. In many cases, the requirement of covering the tread makes retreading prohibitive, or at least less attractive than buying new tires.

A still further disadvantage is that the cord construction is not stretchable sufficiently to overcome the fault of cutting into the buffed surface of the carcass as a consequence of the growth of the casing while being cured in the tire mold with pressures of 135 to 200 pounds per square inch — also as a consequence of flexing which results from rotation of the tires while riding the vehicle. In many instances, failure to stretch has caused cord breaks. This radially inwardly cutting up to the cord plies has also resulted in air pockets that eventually caused a blow out.

After very considerable research on this problem, I made the remarkable and unexpected discovery that the theory of air ventilation of the tire body, dictating the construction of the cord net described in my prior patents, is not entirely correct, particularly in the assumption that the cord net must cover the casing, that is to say, that it must be entrained about the entire perimeter of the casing. This was based on the incorrect assumption in the aforesaid patents that air pressure built up within the cord body must be tapped at a plurality of locations about the entire periphery of the casing to prevent developing air pockets that might lead to tread separation on use of the tire. I found that this theory is wrong and, contrary to such present beliefs in the art, I have made the unexpected discovery that only a single outlet is sufficient to allow excessive pressure built-up within the cord body to escape. This is because of the unexpected discovery that I have made that a tire progressively starts to breathe as it wears out, that is, it breathes through the worn tread surface from small cuts and snags in the worn rubber. In many instances the whole tire will bleed all the trapped air from a single very small puncture in the surface rubber. Also I unexpectedly found that each ply cord layer vents air throughout the entire circumference of the tire.

Therefore, I came to the conclusion that it was not necessary to cover the casing with a network of cord and that, instead, it was sufficient to provide only a patch, transversely of the tire, for effectively bleeding air pockets developed anywhere about the entire perimeter with the aid of the inherent venting characteristics of the cord plies. This appears unbelievable but is absolutely true, that is to say, a patch of cord net extending laterally of the tire (instead of circumferentially) can bleed a pocket 180° away without the necessity of any intermediate cord vents as deemed necessary in said prior patents.

Not only is a single patch less expensive because of the very short length necessary, but actually it is more effective in relieving air pockets, particularly in molds having long skirt matrices which cover three-fourths or more of the sidewalls or in bead-to-bead retreading equipment.

An object of the present invention is to provide a novel tire construction and net cord construction for either retreaded or new tires that will provide an escape path or vent for air pockets that may develop between the casing and tread rubber, either as the result of the recapping process or in ply layers as the result of usage of the tire.

A more specific object is to provide a venting cord net in the form of a laterally extending patch which is capable of venting air pockets along the entire periphery of the tire.

Another object of the invention is to extend the use of the present cord net patches over the surface of a pre-cured tread underneath the plastic envelope which protects it against steam pressure in curing modules so as to vent air otherwise forming pockets in the tread grooves.

Other objects and advantages will become more apparent from a study of the following description taken with the accompanying drawing wherein:

FIG. 1 is a side view of a buffed tire carcass showing a pair of cord net patches, embodying the present invention, on diametrically opposite sides of the carcass;

FIG. 2 is a top, perspective, fragmentary view of a vehicle tire in which the tread layer is shown partly cut-away from the casing or carcass to better illustrate the intermediate cord net patch embodying the principles of the present invention;

FIG. 3 is an enlarged, plan view of one of the cord net patches shown in FIG. 1 and of that shown in FIG. 2;

FIG. 4 is a further enlarged, fragmentary view of a portion of the cord net patch shown in FIG. 3;

FIG. 5 is a further enlarged, fragmentary view of a modified cord net patch construction as compared to that shown in FIG. 4;

Figure 6:
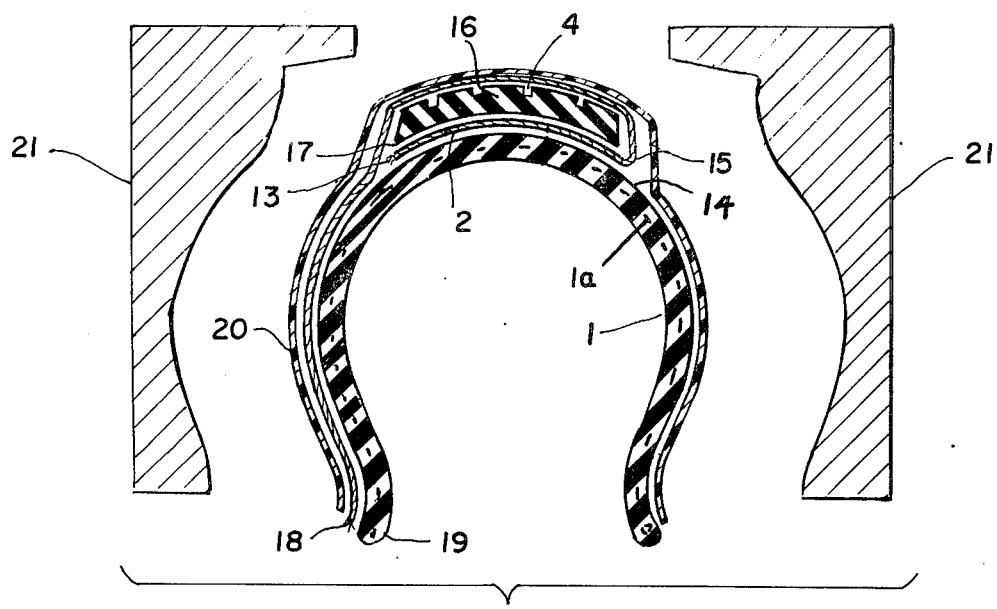
FIG. 6 is a sectional view of a pre-cured tread in a curing module to vent air pockets formed in the tread grooves.

Referring more particularly to FIGS. 1 and 2 of the drawing, numeral 1 denotes a buffed tire carcass, which carcass has the usual cord ply layer or layers 1a extending along the entire periphery. In accordance with the teachings of the present invention, either a single tire patch 2, or preferably more are provided. It is desirable, although not absolutely necessary, that direct contact or a connection be made between a portion of the patch 2 and the topmost ply layer 1a, which can be effected by jamming a short piece of patch 2 radially through the covering rubber of the carcass until it contacts one of the ply layers 1a. In instances where a worn tire has a worn surface which exposes a part of the top ply layer 1a, the spot is skived and the patch will make direct contact with ply layer 1a. In some instances the patch need only extend from a skived area to one of the tire beads or close to it rather than to extend toward both tire beads.

As shown in FIG. 1, the patch 2 extends at least half way of the length of the sidewalls. In other applications, it may extend more than such distance, perhaps three-fourths of the sidewalls or even the entire distance to the beads. The latter arrangement is especially useful for bead-to-bead molding equipment.

The ends of the patches 2 are anchored to the sidewalls by pressure sensitive tape, according to my invention, and it is important that the length of the patches be sufficient so that during the molding process, the ends of the patches will extend beyond the molding shoes of the retreading molds. This will insure that air pockets will not develop in the cord body of the tire as they might otherwise do if the ends of the patches were covered by the molding equipment so as to prevent venting.

After one or more patches 2 are applied laterally of the carcass, a very thin layer of cushion gum 3 is applied thereon to form a bond between the carcass and the retread layer 4. At this point, it should be noted that this construction is also applicable to new tires, that is, where the carcass 1 is brand new rather than buffed after wear. It might be desirable in some instances to apply a slightly porous layer of new rubber between the outermost ply layer 1a and patch 2. Whether tread 4 is a retread of an old tire or a new tread of a new tire, the molding of the intermediate patch 2 is essentially the same as well as the requirement that the ends of the patch extend beyond the mold equipment.

FIG. 3 shows, in somewhat schematic form, the construction of one of the tire patches 2, comprising a cord 6, preferably of cotton since it provides better venting of air, being fibrous, which cord 6 is knitted in sinuous form along a plurality of spaced parallel rows.

FIG. 4 shows the detailed knitted construction which reveals that cotton cord 6 is made up of a plurality of strands and is bent at right angles at its juncture with the knitted cord 7 which extends longitudinally of the patch. This right angular bend of cord 6 is very effective in permitting stretching of cord portion 7 or, more accurately, in permitting shortening of the cord portion 6 in the gap between cords 7, since tensioning of cord 7, as a consequence of molding, will cause a laterally extending portion of the cord 6 to be added to the cord 7 length and taken away from the cord 6 length. Stated differently, cord 7, which is essentially braided with a central core formed from a portion of cord 6 will permit increasingly shorter portions of the length of cord 6 to extend at right angles to cord 7 so as to decrease the length of the portion 6 bridging the gap between the parallel portions 7 and thereby compensate for any abnormal tension in cord 7 due to the molding process or as the result of use of the tire.

FIG. 5 shows a modification of the construction shown in FIG. 4 wherein portion 6 is replaced by an elastic core 11 about which is wound a non-elastic cotton or other fibrous cord 12, either single-filar, bi-filar or multi-filar. Such core 11 of rubber or other elastic material is to insure stretchability of the portion 10 of the net bridging the gap between cords 7. In some instances, especially in case of very high twists of cords 12, the core 11 may be also of cotton or perhaps of nylon or other strong plastic material, in which case it would be far better to have cords 10 of cotton so as to provide a better air vent than would be provided by a plastic fiber such as nylon which is solid rather than fibrous, therefore will not effectively vent air. In short, it is advantageous to provide multi-filar portions throughout the entire net so as to insure a proper air vent path, as compared to a single strand 11 especially of plastic material that is very inefficient in providing air venting.

A recent development in the retreading industry has been the so called "pre-cured retread" or "pre-cured tread." The tread design is pre-cured into the tread rubber while in horizontal presses under extreme pressures. The pre-cured treads are made available in rolls or in endless loops or hoops. Cushion gum may be applied to the bottom surface which does not bear a tread, either at the factory or at the retread shop. Such cushion gum will serve as the bonding agent between the buffed surface of the tire and the pre-cured tread. After the pre-cured hoop and cushion gum is applied to the buffed surface, the tread surface of the pre-cured tread is subjected to steam and air under high pressure in curing devices which are called "cure modules," that is, matrices or annular steam chambers without tread designs for curing the cushion gum bond between the buffed surface and pre-cured tread.

After the tread is applied and attached to the buffed tire by the cushion gum, the tread surface must be protected from direct steam and/or air pressure in the cure module. This is done with an annular envelope of plastic material, which envelope resembles a large inner tube with a strip of perhaps 2 or 3 inches of rubber cut from the inside diameter, that is, cut from the area where the valve would be located. Such envelope is placed over and surrounds the tread and tire to within an inch or two from the base of the beads.

The netted patch can be used to effectively vent three areas during the time a pre-cured tire is in the module, namely, the air within the cord body of the tire, exposed cords, nail holes, skived areas, and all injured areas; also the air between the pre-cured tread and buffed surface; and particularly the air that is trapped within the tread grooves or designs of the pre-cured treads. All such venting is effectively accomplished according to the present invention without leakage of air through the seal between the envelope and sidewalls of the tire.

By inserting the cord net between the tread surface and envelope in a somewhat loose manner, the envelope is permitted to penetrate into the tread grooves since there are no trapped air pockets therein because of the venting effect of the cord net, which cord net is of sufficiently small diameter so as to project to the base of the tread grooves. This allows equal working pressure of the steam to every square inch of the pre-cured tread including the grooved area without distortion of the pre-cured tread. Thus, the envelope seals perfectly and the cord net allows all trapped air in the tread grooves to breath freely during the curing process.

In operation, it is preferable to use one or more patches, preferably three patches evenly spaced around the periphery of the pre-cured tread. The patches are extended radially either from bead to bead or from one shoulder of the tread across to the opposite shoulder and beyond so as to extend down to the bead area.

Referring more particularly to FIG. 6, a patch of cord net 2 is started at the shoulder area 13 of the buffed area 14, thence to a point approximately six inches below the opposite bead. The beginning end of the patch should be held in position with a very thin strip of cushion gum. After cutting the patch about 6 inches below the bead, as indicated above, the patch is folded and stapled at 15 to the sidewall of the tire. The pre-cured tread rubber 16 is then applied by attaching it, by means of the cushion gum 17, to the buffed surface. The excess patch is freed from the sidewall of the tire and folded back over the surface of the pre-cured tread and the end thereof 18 is stapled at a point just above the bead area 19. In other words, the patch should extend just below the portion of the tire covered by the plastic envelope 20 surrounded by the module or mold 21. Thus the cord net can effectively vent three areas during the time a pre-cured tire is in the module, namely, the air within the cord body of the tire, exposed cords, nail holes, skived areas and all injured areas; air between the pre-cured tread and the buffed surface and air that is trapped within the tread designs of the pre-cured tread. Preferably, three or four patches are applied laterally over the tread, one on each side of the splice of the pre-cured tread (if originally in strip form) and one or two other patches evenly spaced therefrom along the periphery of the tire.

Precaution should be taken that the portion of the patch that covers the pre-cured tread shall not be pulled or stretched tight, but instead, should be slack so that when the envelope is under pressure by steam and/or air, it will fully conform to the contour of the tread design, including the grooved areas, and permit the envelope to actually penetrate the grooves and touch the base of such grooves, since they are freed of air pockets as the result of venting by the patches. Further precaution should be taken that a net with large openings be used, at least about 1 inch openings, so as to freely allow passage of heat therethrough, rather than a heat insulating covering as would be provided by burlap or cloth. The diameter of the cords of patch 4 is somewhat critical, since it must be small enough to conform to the grooves and large enough to effectively vent air to the exterior of the mold or module, yet not so large as to break the seal between the plastic cover 20 and tire. A suitable diameter is about 16 to 8 gauge.

In some cases, the slack cords of the patch may be better inserted in the grooves by preforming either a metal or plastic mold which complements the grooves of the pre-cured treads and sandwiching the cords therebetween, pushing the mold downwardly to force the cords to the base of the tread grooves.

Figure 7:
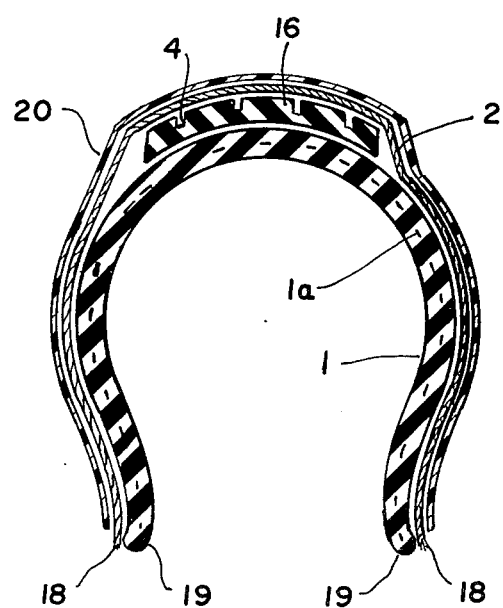
FIG. 7 is a modification of the sectional view shown in FIG. 6 for venting only the air pockets in the grooves of the tread.

FIG. 7 shows venting of the outer surface and grooves in pre-cured tire treads. One or more (preferably three or four) patches may be applied only across the pre-cured grooves and underneath the plastic envelope from about one bead portion to the opposite bead portion without extending into the area between the buffed surface and tread.

If instead of module 21, the beads 19 are mounted on a tire rim and a bleeding valve is attached to the outer surface of envelope 20, the reversely bent portion of patch 10 is terminated after covering tread 16. Where the tread design is not continuous circumferentially, there may be added, to the patches described above, either a pair or more of cords extending throughout the entire circumference of the tire and contacting the patches centrally or perhaps a narrow or ordinary net of cord 2 which extends completely circumferentially and centrally and is in contact with the lateral patches. This will provide venting of all air in all grooves circumferentially and laterally, even when the grooves are not continuous circumferentially.

Referring to FIGS. 1 and 2, it was pointed out that in cases where an injury occurs on the tire casing, the injured portion should be skived to expose ply layer 1a and allow direct contact between the cord strands, particularly where they intersect, and the uppermost ply layer 1a. This contact can be enhanced by coating the skives with vulcanizing cement or building a plug over the skive to force the strands down into positive contact with ply layer 1a. In cases of perfectly sound casings with no significant injuries, the patch area or areas should preferably be perforated before applying the patch or patches to form channels for escape of air from the top ply 1a into the patch 4 and then outwardly. Such perforations may be made with a roller having a plurality of pin-like projections on its entire perimeter.

Thus it will be seen that I have provided a highly efficient method of applying an air venting patch to a tire for venting injured portions of the tread surface, the area between the buffed carcass and cushion gum, the cord ply layer, and the outer surface of the pre-cured tread when it is placed in a cure module for curing the bond so that when air and steam under pressure is applied to the covering plastic envelope, it will force the cords of the patch into the grooves of the tread to vent air pockets otherwise remaining in the grooves and thus apply uniform air pressure even within the grooves. Venting of the cord ply layer will also be effective during use of the tire when air in the tire penetrates the tire liner and infiltrates the cord ply layers.

While I have illustrated and described several embodiments of my invention, it will be understood that these are by way of illustration only and that various changes and modifications may be contemplated in my invention and within the scope of the following claims.

I claim:

1. The method of retreading and curing a tire, comprising providing a pre-cured rubber tread having a pre-cured tread design, applying cushion gum to the inner surface thereof, applying a net of cord loosely across the width of said tread underneath said cushion gum with its ends terminating near the beads of the tire, and adhering the cushion gum to the buffed tire surface to be retreaded, covering said pre-cured tread short of the area of the beads with a thin plastic envelope, surrounding the tire and enveloped tread with a curing module in the form of an annular chamber, allowing the ends of said patch to extend outwardly of said envelope and module, applying steam and air under pressure in said module between the envelope and inner peripheral walls of said chamber so that portions of the envelope will penetrate into the grooves of said tread and force said cord towards the base of said tread grooves so as to vent air from pockets otherwise formed in said grooves by passing air through said cords to the ends thereof adjacent said beads exteriorly of said envelope.

2. The method of retreading and curing a tire as recited in claim 1 comprising laying said cord net, preliminary to applying the cushion gum on the buffed tire surface, across the buffed surface and forcing at least a portion thereof into contact with at least one ply cord layer in the tire carcass so as to vent trapped air pockets through said ply cord layer, and after said pre-cured tread is adhered to the buffed surface, laying the remaining portion of said cord net across the top surface of said pre-cured tread.

3. The method of venting air pockets in the grooves of a pre-cured tire tread while curing the bonding of said tread to a tire casing contained in a module, comprising closely surrounding said pre-cured tire tread with a plastic envelope which is in spaced relationship with said module, applying at least one patch of a network of air-conducting cord of relatively large mesh above and laterally across said tire tread so that the ends of the patch extend outwardly of said plastic envelope and said module, and introducing steam under pressure in the space between said plastic envelope and said module, whereby the strands of said network of cord will be pushed into the grooves of said tread and vent air pocket otherwise formed therein to the ends of said network and into the surrounding atmosphere, whereby uniform pressure is applied to the inner surfaces of said grooves.

4. The method recited in claim 3 wherein a plurality of patches of the construction recited are extending laterally over said casing at circumferentially spaced relationship.

5. The method recited in claim 4 together with air-conducting cords extending along the circumference of said tire casing and being directly connected to said patches to vent air both circumferentially and radially of said tire casing.

6. The method recited in claim 3 wherein said network of cord is of cotton of a mesh size of the order of at least about 1 inch and a gauge of about 8, which cord is knitted so as to be stretchable and so as to effectively vent air without breaking the seal between the sidewalls of the tire and the plastic envelope and module.

7. The method of venting air pockets developed between a tire casing having at least one cord ply layer covered with a thin cushion gum and a rubber tread while the tire is being retreaded in an annular curing chamber having side flanges engaging the sidewall of the tire casing adjacent the beads, comprising applying a network of cord of relatively large mesh in the form of a patch laterally across said tire casing between the inner surface of said cushion gum and said rubber tread and extending to points along the sidewalls well beyond said rubber tread and beyond said side flanges of said curing chamber while leaving substantially the entire remainder of said casing uncovered with said network of cord, and directly connecting said patch to said cord ply layer, whereby trapped air between said casing and rubber tread and in said cord ply layer will be vented through the cords of said patch and ultimately escape from the ends of said patch to the atmosphere, said tread rubber being pre-cured and surrounded by a plastic envelope having side edges beyond which the ends of said patch extend, and a rigid module surrounding said envelope in spaced relationship, said patch having an extension doubled back from one shoulder and extending across the top surface of said tread, steam being applied to the space between said plastic envelope and module to cause portions of said envelope to penetrate the grooves of said tread and to push the strands of said extension into said grooves, whereby air otherwise trapped in said grooves will be vented through the strands of said patch extension to the ends thereof, escaping into the atmosphere beyond the edges of said plastic envelope and module.

* * * * *